United States Patent [19]
Kalenian

[11] Patent Number: 6,125,327
[45] Date of Patent: Sep. 26, 2000

[54] SYSTEM FOR IDENTIFYING AND GENERATING GEOGRAPHIC MAP DISPLAY OF AIRCRAFT ICING CONDITIONS

[75] Inventor: James A. Kalenian, Melbourne, Fla.

[73] Assignee: Harris Corporation, Melbourne, Fla.

[21] Appl. No.: 08/783,277

[22] Filed: Jan. 15, 1997

[51] Int. Cl.[7] .................................................. G06F 169/00
[52] U.S. Cl. ................................................................ 702/3
[58] Field of Search .................... 702/3, 4, 5; 73/170.26; 342/26, 460; 340/580–583

[56] References Cited

U.S. PATENT DOCUMENTS

| | | | |
|---|---|---|---|
| 4,035,644 | 7/1977 | Ciemochowski | 250/340 |
| 4,327,286 | 4/1982 | Thoma | 340/583 |
| 4,441,363 | 4/1984 | Hill et al. | 340/582 |
| 4,890,494 | 1/1990 | Osbond et al. | 73/73 |
| 5,024,526 | 6/1991 | Von Redwitz | 356/73 |
| 5,028,929 | 7/1991 | Sand et al. | 342/26 |
| 5,488,375 | 1/1996 | Michie | 342/26 |
| 5,777,481 | 7/1998 | Vivekanandan | 324/640 |

OTHER PUBLICATIONS

D. L. Westphal et al., "Initialization and Validation of a Simulation of Cirrus Using FIRE–II Data", Journal of the Atmospheric Sciences, Dec. 1, 1996, V53, N23, pp. 3397–3429.

Judith A. Curry et al., "Assessment of Aircraft Icing Potential Using Satellite Data", Journal of Applied Meteorology, Jun., 1992, V31, N6, pp. 605–621.

Patrick Minnis et al., "The 27–28 Oct. 1986 FIRE IFO Cirrus Case Study: Cirrus Parameter Relationships Derived from Satellite and Lidar Data", Monthly Weather Review, Nov. 1990, V118, N11, pp. 2402–2425.

*Primary Examiner*—Donald E. McElheny, Jr.
*Attorney, Agent, or Firm*—Charles E. Wands

[57] ABSTRACT

A satellite data processing aircraft icing detection and display mechanism comprises a communication link coupled with an earth-imaging satellite containing a terrestrial-directed imagery sensing system, which conveys data associated with multiple images representative of characteristics of the earth's atmosphere in a viewed terrestrial area. A digital imagery data processor is coupled to the communication link, and is operative to process the data to provide an indication of intensity and height of potential areas of aircraft icing. An icing display subsystem is coupled with the digital imagery data processor and is operative to generate a multi-pixel map image showing the geographical location, intensity and height of an identified aircraft icing layer.

28 Claims, 3 Drawing Sheets

SYSTEM FOR IDENTIFYING AND GENERATING GEOGRAPHIC MAP DISPLAY OF AIRCRAFT ICING CONDITIONS

FIELD OF THE INVENTION

The present invention relates to aircraft weather forecast and display systems, and is particularly directed to a new and improved satellite imagery data processing system for identifying, updating and generating a multicolor graphics display of current aircraft icing conditions and/or those conducive to icing.

BACKGROUND OF THE INVENTION

Aircraft icing is one of many hazards pilots can expect to encounter in the course of their aviation careers. Although water on a road or in a puddle will freeze when the temperature drops below zero degrees C., water droplets in free air do not necessarily freeze at and/or somewhat below zero degrees C. When the internal stability of a supercooled water droplet is destroyed due to impacting the surface of an aircraft, its freezing temperature rises. As a consequence, for any flight through supercooled clouds or liquid precipitation at temperatures below freezing, there is a possibility of icing. In order for significant amounts of ice to form on an aircraft, the following two conditions must be satisfied: 1) the temperature of the surface of the aircraft must be colder than zero degrees C., and 2) water droplets present in the air contacting the surface of the aircraft must be supercooled—well below freezing (in a temperature range of between −10 and −40 degrees C.).

Current used methods of icing detection and forecasting in the aviation community, which are slowly becoming, if not already, obsolete, include large area icing forecasting techniques, such as AIRMET, SIGMET, freezing level analysis, the use of satellite images, low-level significant weather prognosis, etc. Icing forecasting techniques typically rely on the assimilation of instrumentation data, which is usually on the order of several to twelve hours old, supplied from a plurality of geographically dispersed ground stations, deciphering the data and then delivering a text report giving a relatively coarse estimate of where icing conditions might be present. The AIRMET and SIGMET forecasting schemes, for example, cover a very large, and therefore coarse, area of at least 3,000 square miles at any one time and are updated only every four to six hours.

The following is a non-limiting example of an AIRMET advisory weather report for a location in Alaska:

AK PEN . . . VALID UNTIL 220800 . . . CLDS/WX . . . OCNLY MDT ICGICIP 070-140. ENDG BY OOZ. FRZL VL 070 LWRG TO 040 BY 06Z.

This report describes occasionally moderate icing in clouds and in precipitation from 7,000 to 14,000 feet, expected to end by 000Z, and freezing levels at 7,000 feet lowering to 4,000 feet, which are expected to end by 06Z.

Similarly a non-limiting example of a SIGMET advisory weather report for the Arkansas, Louisiana and Mississippi region reads as follows:

DFWP UWS 051710 SIGMET PAPA 1 VALID UNTIL 052110
AR LA MS FROM STL TO 30N MEI TO BTR TO MLU TO STL
. . . OCNL SVR ICING 90 TO 130 EXPCD. FRZLVL 80 E TO 120 W. CONDS CONTG BYD 2100Z.

According to this advisory, in an area from St. Louis, Mo. to 30 miles North of Meridian, Miss. to Baton Rouge, La. to Monroe, La. to St. Louis, Mo., occasional severe icing can be expected from 9,000 to 13,0000 feet, with freezing levels from 8,000 feet in the East to 12,000 feet in the West. These conditions are expected to continue beyond 2100Z.

Although such forecasting products provide some assistance in determining where icing areas may exist, a pilot must also consider a multitude of other products to identify icing areas. Moreover, since atmospheric conditions are constantly changing, employing instrumentation data that is hours old is not a practical way to provide a necessarily accurate or timely indication of icing. Further, even through past and present usage of satellite, radar and other graphical and textual products provide an approximation of potential icing areas, they fall short in regards to simplicity, accuracy, detail and timeliness.

SUMMARY OF THE INVENTION

In accordance with the present invention, the shortcomings of the conventional icing identification and forecasting products described above are remedied by a new and improved icing detection and display mechanism, which is area, altitude, and intensity-specific, and is operative to identify, update, and generate a multicolor graphics display of current aircraft icing conditions and/or those conducive to icing. As will be described, the icing detection and display mechanism of the invention displays aerial coverage, intensity, top of the icing layer, and movement along with color enhancement of icing areas to facilitate icing identification. Using currently available satellite images, Nexrad products, having practically timely updates (available every fifteen minutes), and other icing algorithms to detect significant aircraft icing, the icing identification mechanism of the present invention is operative to depict icing areas that are in the process of forming, currently exist and are dissipating in real-time.

For this purpose, the present invention employs an earth-imaging satellite containing a terrestrial-directed sensing system, such as a multiple wavelength-sensitive optical imagery system, which produces multiple images representative of characteristics of the atmosphere in the viewed terrestrial area of interest, such as the North American continent. As a non-limiting example, the earth-imaging satellite may comprise the GOES (geostationary operational environmental satellite) system, which provides multiple wavelength images, enhanced resolution satellite images. A first wavelength image is used to distinguish water clouds from ice clouds during the day, while the second wavelength image is employed to enhance cloud edges and tops, making them more defined, and identifies cloud top temperatures below freezing.

Digital data representative of the two wavelength images is processed to identify supercooled water clouds during the day, and thereby provide an indication of potential areas of significant aircraft icing. Because the GOES system provides images that are updated every fifteen minutes, the invention operates practically in real time. In order to determine the intensity of the icing layer, that has been identified by processing the two wavelength images to identify supercooled water clouds, the invention preferably employs the Nexrad national mosaic of composite reflectivity, using predetermined calculations relating icing intensity to radar reflectivity. Data from the Nexrad Echo Tops signal processing mechanism may be used to estimate the top of the icing layer in thousands of feet MSL.

Multiple colors may be used to differentiate between the types of icing intensities. Where supercooled water clouds are detected, and the radar image is not reporting echoes, supercooled water clouds are displayed in a different color representing potential icing of unknown intensity. The icing display mechanism of the present invention may be animated to show areas of formation, growth, decay, and dissipation. In addition to past and present icing conditions, a determination can be made if the threat and trend of icing will continue for that specific flight path.

The icing display mechanism of the invention preferably uses a dynamic point-and-click routine, through which an operator, using a computer mouse, may open a dialog box (interrogate function) to provide additional information about the icing characteristics present. This additional information includes latitude, longitude, location identifier of the nearest surface station, time, top of the icing layer and intensity. Then, using a computer mouse, the operator may move the cursor over a geographical area to retrieve the additional information mentioned above.

DETAILED DESCRIPTION

Figure 1:
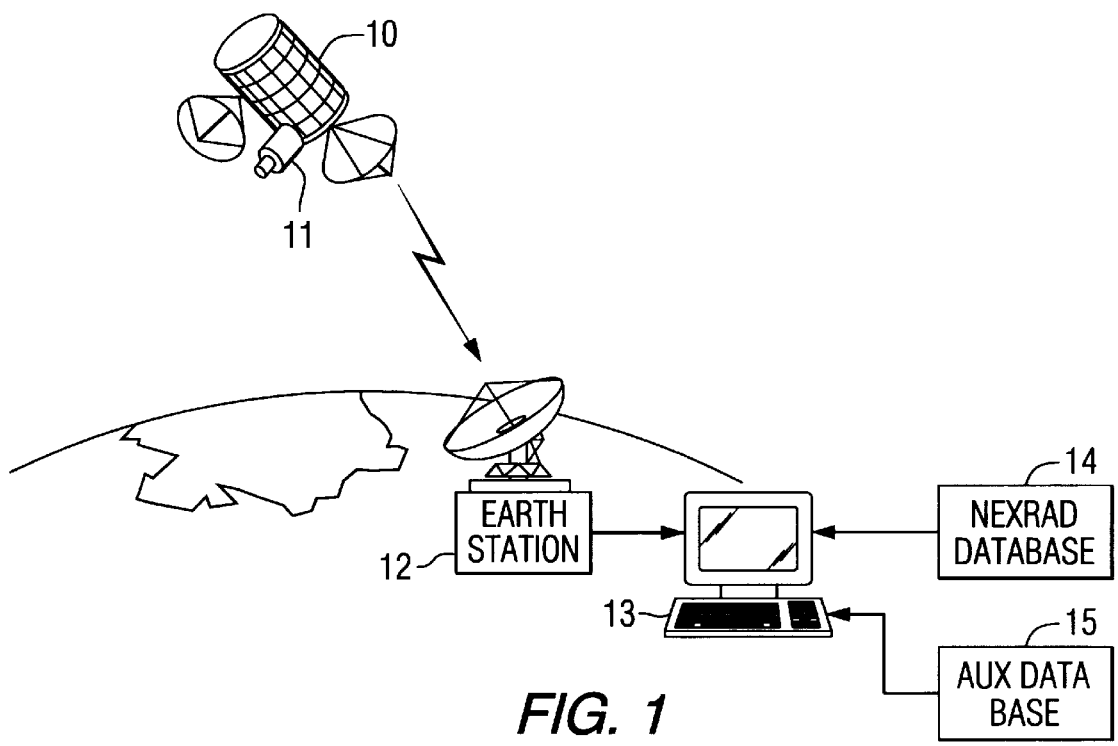
FIG. 1 diagrammatically illustrates the overall configuration of the icing detection and display system of the present invention.

Before describing in detail the new and improved icing identification and display system in accordance with the present invention, it should be observed that the invention resides primarily in what is effectively a prescribed arrangement of readily available atmospheric condition sensing devices, communication units and associated digital signal processing and display components and attendant supervisory control circuitry therefor, that controls the operation of the system.

Consequently, the configuration of such system components, and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein.

Thus, the block diagram illustrations are primarily intended to show the major components of the system in a convenient functional grouping, whereby the present invention may be more readily understood.

As pointed out briefly above, the icing detection and display system of the present invention is area, altitude, and intensity-specific, and is operative to identify, update, and generate a multicolor graphics display of current aircraft icing conditions and/or those conducive to icing. The invention displays aerial coverage, intensity, top of the icing layer, and movement of an icing layer along with color enhancement of icing areas to facilitate icing identification. As will be described, the invention employs readily available GOES satellite images and Nexrad subsystem components, which are updated at a practical timely rate of every fifteen minutes, and uses qualitative and quantitative icing condition algorithms to detect and dynamically display icing areas that are currently in the process of forming, icing conditions which already exist and those which are dissipating in real-time.

Figure 2:
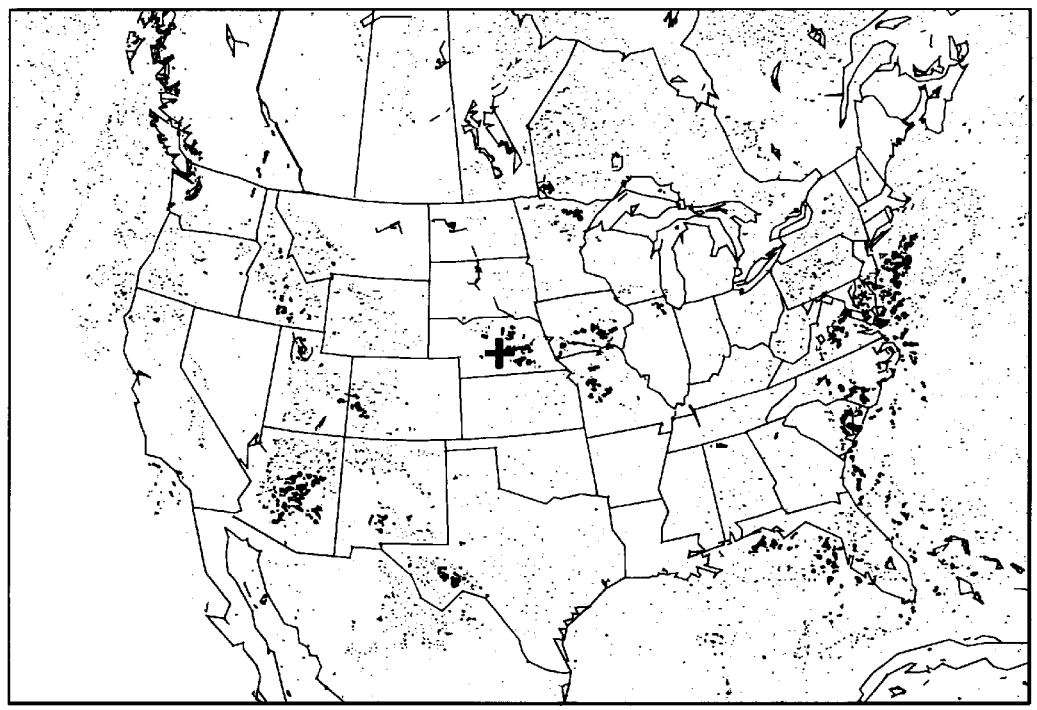
FIG. 2 is an image map of the North American continent.

FIG. 1 diagrammatically illustrates the overall system configuration of the invention as comprising an earth-imaging satellite 10, which contains a terrestrial-directed sensing system 11, such as a multiple wavelength-sensitive optical imaging system, which produces multiple images representative of characteristics of the atmosphere in the viewed terrestrial area of interest, such as the North American continent, as shown in the imaged map diagram of FIG. 2. Imagery data from this imaging system is transmitted to an earth station 12, so that the data may be processed and distributed to various users, such as the National Weather Service and other system subscribers.

Figure 3:
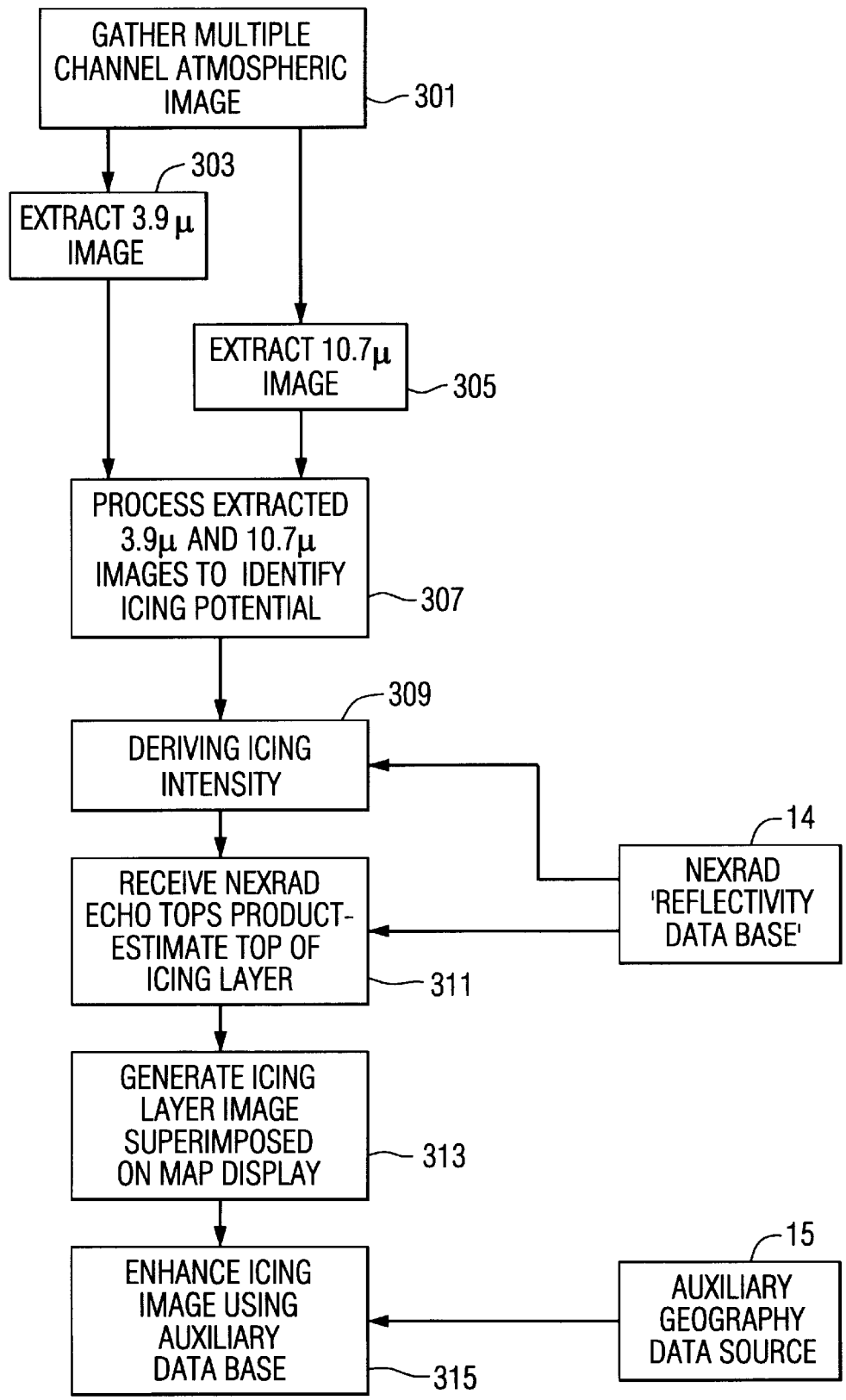
FIG. 3 is an atmosphere imagery processing flow diagram employed in the icing detection and display system of the present invention.

As a non-limiting example, the earth-imaging satellite 10 may comprise the GOES (geostationary operational environmental satellite) system, which provides multiple (infrared) wavelength images, including 3.9 micron and 10.7 micron channel, 8 km resolution satellite images, as shown at step 301 in the atmosphere imagery processing flow diagram of FIG. 3. As shown at step 303, the 3.9 micron image is used to distinguish water clouds from ice clouds during the day, employing nominal count values of 47 to 56. As shown at step 305, the satellite's 10.7 micron image is employed to enhance cloud edges and tops making them more defined, and identifies cloud top temperatures that are below freezing, and employs nominal count values of 39 to 47.

From the earth station 12, which contains communication link equipment, including antenna, transceiver, and data processor subsystems, such as a HWDS (Harris Weather Data Service) 1 system, or other system-coupled site(s), digital data representative of the 3.9 and 10.7 micron channel images may be further linked (e.g., via a Galaxy IV Data Reception/Transmission Satellite) to another earth station, such as one employing a HWDS 3 system, which supplies its weather system data to an image processing workstation 13. The workstation 13 processes this data to identify supercooled water clouds during the day, so as to provide an indication of potential areas of significant aircraft icing (step 307). Steps 301–307 may be executed using a Harris Universal Software Downloadable Deaccumulator (USDD), which extracts and processes GOES data.

Since the GOES system is currently operative to provide images on the hour and at thirty minutes past the hour, when viewing the United States, and at fifteen and forty-five minutes past the hour, when viewing the Northern Hemisphere (including the United States), by using both sets of images, images of the contiguous United States are updated every fifteen minutes.

In order to determine the intensity of the detected icing layer, obtained by processing the 3.9 and 10.7 micron channel images to identify supercooled water clouds, image processor workstation 13 also is coupled to a Nexrad database 14, also linked to the Galaxy IV Data Reception/Transmission Satellite, and supplying a national mosaic of composite reflectivity. The NEXRAD database may be provided from a commercial NEXRAD source, such as UNYSIS. The data derived in step 307 may be coupled to an icing intensity derivation step 309 by using a high speed data link driven by UCONX software.

As shown in step 309, icing layer intensity is derived in accordance with predetermined calculations that relate icing intensity to liquid water content and ultimately, to radar reflectivity, shown in Table 1, which shows the relationship of icing intensity to liquid water content derived by the National Advisory Committee on Aeronautics (NACA).

TABLE 1

| Cumuliform Clouds Liquid H$_2$O Content* (gm/m$^3$) | Icing Intensity | Stratiform Clouds Liquid H$_2$O Content** (gm/m$^3$) |
|---|---|---|
| <=0.07 | Trace | <=0.11 |
| 0.08–0.49 | Light | 0.12–0.68 |
| 0.50–1.00 | Moderate | 0.69–1.33 |
| >1.00 | Severe | >1.33 |

*Assumed droplet diameter 17 microns.
**Assumed droplet diameter 14 imicrons.

For the above-listed parameters, the relationship between liquid water content and radar reflectivity can be precalculated by using the vertically integrated liquid (VIL) equation. Namely, $$M = 3.44 \times 10^{-3} Z^{4/7}$$

where M is liquid water content g/m$^3$ and Z is radar reflectivity (mm$^6$/m$^3$), (rather than Zulu time (Greenwich mean time) in the previously referenced AIRMET and SIGMET advisory examples).

Solving for radar reflectivity Z, and using the liquid water content values from Table 1 for liquid water content (M), the intensity of icing may be determined from radar reflectivity.

For this purpose, Table 2 shows a relationship between icing intensity and radar reflectivity.

TABLE 2

| Cumuliform Clouds Radar Reflectivity (dBZ) | Icing Intensity | Stratiform Clouds Radar Reflectivity (dBZ) |
|---|---|---|
| <23 | Trace | <27 |
| 23–37 | Light | 27–40 |
| 38–44 | Moderate | 41–46 |
| >44 | Severe | >46 |

For simplicity, the following scale for icing intensity is employed:

| Radar Reflectivity (dbz) | Icing Intensity |
|---|---|
| <25 | Trace |
| 25–39 | Light |
| 40–44 | Moderate |
| >44 | Severe |

As shown by step 311, data received from the Nexrad Echo Tops signal processing mechanism may be used to derive an estimate of the top of the icing layer in thousands of feet MSL. As a non-limiting example, Weather MAX and Harris NEXREAP (Next Generation Real Time Environmental Application Processor) software may be used for this purpose.

Figure 4:
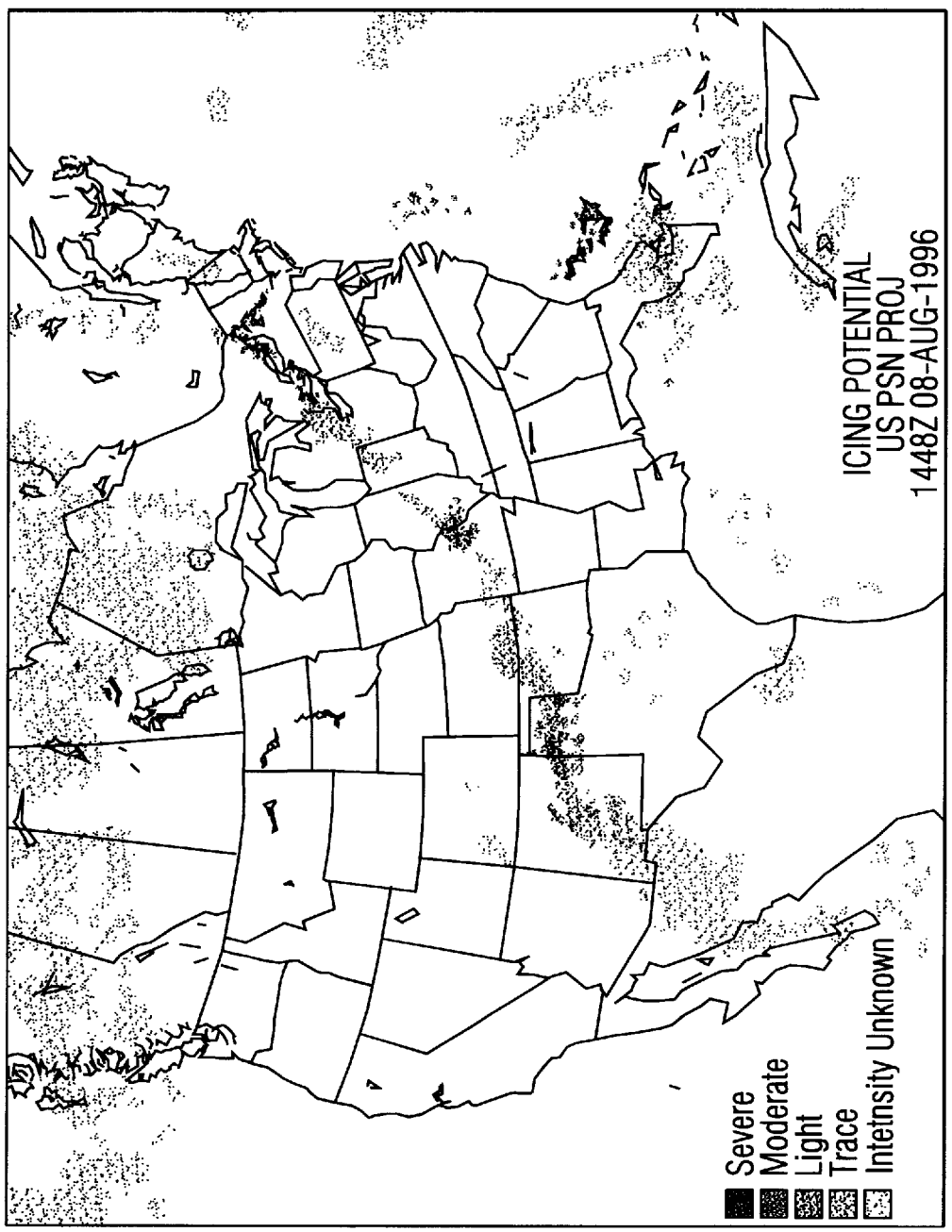
FIG. 4 an image map display of the North American continent having a superimposed icing image derived by the icing detection and display system of the present invention.

In the course of displaying the icing image, shown in FIG. 4 (step 313), different colors may be used to differentiate between the types of icing intensities. Where supercooled water clouds are detected and the radar is not reporting any echoes, supercooled water clouds may be displayed in a different color representing potential icing of unknown intensity.

The displayed icing image generated in step 313 (again using Harris NEXREAP software) can be animated to show areas of formation, growth, decay, and dissipation. In addition to past and present icing conditions, a forecast can be made to determine if the threat and trend of icing will continue for that specific flight path.

The icing display mechanism preferably uses a dynamic point-and-click routine, through which the operator, using a computer mouse, may open a dialog box (interrogate function) to provide additional information about the icing characteristics present. This additional information provided from an auxiliary geography data source 15 in step 315, includes latitude, longitude, location identifier of the nearest surface station, time, top of the icing layer and intensity. Then, using a computer mouse, the operator may move the cursor over a geographical area to retrieve the additional information mentioned above.

As will be appreciated from the foregoing description, the icing detection and display mechanism of the present invention is effective to obviate the previously described shortcomings of conventional icing identification and forecasting products by means of an area, altitude, and intensity-specific scheme, which identifies, updates, and generates a multi-color graphics display of current aircraft icing conditions and/or those conducive to icing. Such performance capabilities enable the invention to aid in pre-flight planning and critical in-flight decisions for government, commercial, military, and recreational aircraft. The invention makes it possible for specific aerial coverage, upper limits of icing areas and intensities to be displayed in a picture-like format that can easily be distributed to pilots. Further, the animation functionality of the invention makes it possible to show areas of formation, growth, decay, and dissipation. In addition to viewing past and present icing conditions, the user can make a forecast to determine if the threat and trend of icing will continue for a given flight path.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A method of identifying a geographical area of aircraft icing conditions comprising the steps of:
   (a) processing data representative of supercooled water in the atmosphere to provide first imagery data representative of the geographical location of an icing layer;
   (b) providing second imagery data representative of the intensity and height of said icing layer; and
   (c) processing said first and second imagery data to generate a display showing the geographical location, intensity and the height of said icing layer.

2. A method according to claim 1, wherein step (a) comprises:
   (a1) providing first data from a non-terrestrial sensor device representative of a layer of water in the atmosphere,
   (a2) providing second data from a non-terrestrial sensor device representative of the temperature of said layer of water in the atmosphere, and
   (a3) processing said first and second data provided in steps (a1) and (a2) to generate said data representative of supercooled water in the atmosphere.

3. A method according to claim 2, wherein said first and second data provided in steps (a1) and (a2) comprises satellite imagery data.

4. A method according to claim 2, wherein step (a3) comprises generating said data representative of supercooled water in the atmosphere in dependence upon said second data being representative of a temperature of said layer of water below freezing.

5. A method according to claim 2, wherein step (b) includes processing radar reflectivity data to generate data representative of the intensity of said icing layer.

6. A method according to claim 5, wherein said radar reflectivity data comprises a Nexrad national mosaic of composite reflectivity data.

7. A method according to claim 2, wherein step (c) comprises generate a multi-pixel geographical map display having respective pixels thereof illuminated in accordance with the geographical location and altitude of said icing layer.

8. A method according to claim 7, wherein step (c) comprises generate a multicolor geographical map display having respective pixels thereof color-illuminated in accordance with the intensity of said icing layer.

9. A method according to claim 8, wherein step (b) includes processing radar reflectivity data to generate data representative of the intensity of said icing layer.

10. A method according to claim 9, wherein step (c) comprises, in response to data processed in step (a) being representative of supercooled water, but said radar reflectivity data in step (b) showing no echoes therefrom, illuminating pixels of said display associated with said supercooled water with a prescribed color representative of a potential icing of unknown intensity.

11. A system for identifying a geographical area of aircraft icing conditions comprising:
a first communication port coupled to a satellite imagery sensing subsystem supplying first imagery data representative of a layer of supercooled water in the atmosphere;
a second communication port coupled to a radar imagery data source which supplies second imagery data representative of the intensity and height of said supercooled water layer;
an imagery data processor which is operative to process said first and second imagery data to provide third imagery data representative of the geographical location and intensity of an icing layer; and
a display unit which is operative to generate a multi-pixel map image showing the geographical location, intensity and height of said icing layer in accordance with said third imagery data.

12. A system according to claim 11, wherein said satellite imagery sensing system is operative to provide first data representative of a layer of water in the atmosphere, and second data representative of the temperature of said layer of water in the atmosphere, and to generate said first imagery data representative of supercooled water in the atmosphere in accordance with said first and second data.

13. A system according to claim 12, wherein said satellite imagery sensing system is operative to generate said first imagery data representative of supercooled water in the atmosphere, in dependence upon said second data being representative of a temperature of said layer of water below freezing.

14. A system according to claim 11, wherein said imagery data processor is operative to process radar reflectivity data obtained from said second communication port to generate data representative of the intensity of said icing layer.

15. A system according to claim 14, wherein said radar reflectivity data comprises a Nexrad national mosaic of composite reflectivity data.

16. A system according to claim 11, wherein said display unit comprises a multi-pixel geographical map display having respective pixels thereof illuminated in accordance with the geographical location and altitude of said icing layer.

17. A system according to claim 16, wherein said display unit is operative to generate a multicolor geographical map display having respective pixels producing a color image in accordance with the intensity of said icing layer.

18. A system according to claim 17, wherein said imagery data processor is operative to process radar reflectivity data to generate data representative of the intensity of said icing layer.

19. A system according to claim 18, wherein said display unit is operative, in response to said first imagery data being representative of supercooled water, but with said radar reflectivity data showing no echoes therefrom, to illuminate pixels associated with said supercooled water with a prescribed color representative of a potential icing of unknown intensity.

20. A system for identifying and displaying a geographical area of aircraft icing conditions comprising:
a first communication link coupled with an earth-imaging satellite containing a terrestrial-directed sensing subsystem, which conveys first imagery data associated with multiple images representative of characteristics of the earth's atmosphere in a viewed terrestrial area;
a second communication link coupled to a radar imagery data source which supplies second imagery data representative of the intensity and height of said supercooled water layer;
a digital imagery data processor, coupled to said first and second communication links, and being operative to process said first and second imagery data to provide an indication of intensity and height of potential areas of aircraft icing; and
an icing display subsystem which is operative to generate a multi-pixel map image showing the geographical location, intensity and height of said indication of said potential areas of aircraft icing.

21. A system according to claim 20, wherein said earth-imaging satellite is operative to provide first data representative of a layer of water in the atmosphere, and second data representative of the temperature of said layer of water in the atmosphere, and to generate first imagery data representative of supercooled water in the atmosphere.

22. A system according to claim 21, wherein said earth-imaging satellite is operative to generate data representative of supercooled water in the atmosphere in dependence upon said second data being representative of a temperature of said layer of water below freezing.

23. A system according to claim 21, wherein said digital imagery data processor is operative to process radar reflectivity data supplied from said second communication link to generate said second imagery data representative of the intensity of said icing layer.

24. A system according to claim 23, wherein said digital imagery processor is operative to provide an indication of intensity of potential areas of aircraft icing in accordance with radar reflectivity data supplied thereto.

25. A system according to claim 21, wherein said icing display subsystem comprises a multi-pixel geographical map display having respective pixels thereof illuminated in accordance with the geographical location and altitude of said icing layer.

26. A system according to claim 25, wherein said icing display subsystem is operative to generate a multicolor geographical map display having respective pixels producing a color image in accordance with the intensity of said icing layer.

27. A system according to claim 26, wherein said icing display subsystem is operative, in response to said first imagery data being representative of supercooled water, but with said radar reflectivity data showing no echoes therefrom, to illuminate pixels associated with said super cooled water with a prescribed color representative of a potential icing of unknown intensity.

28. A system according to claim 21, wherein said digital imagery data processor is operative to determine the intensity of said icing layer, by processing multi-wavelength images to identify supercooled water clouds, and processing composite radar reflectivity data to derive icing intensity in relation to liquid water content of said supercooled water clouds.

* * * * *